United States Patent [19]

Jennings et al.

[11] Patent Number: 5,184,545
[45] Date of Patent: Feb. 9, 1993

[54] ROUND BALER TWINE WRAPPING APPARATUS

[75] Inventors: Richard E. Jennings, Manheim; Stephen C. Schlotterbeck, Leola, both of Pa.

[73] Assignee: Ford New Holland, Inc., New Holland, Pa.

[21] Appl. No.: 848,488

[22] Filed: Mar. 9, 1992

[51] Int. Cl.⁵ .................. B65B 13/18; A01D 39/00
[52] U.S. Cl. .......................... 100/5; 56/341; 100/13; 100/88
[58] Field of Search .............. 100/5, 13, 88, 89; 56/341, 343

[56] References Cited

U.S. PATENT DOCUMENTS

| | | | |
|---|---|---|---|
| 2,627,223 | 2/1953 | Berge | 100/5 X |
| 4,174,661 | 11/1979 | Mathes et al. | 100/13 X |
| 4,248,143 | 2/1981 | Gaeddert | 100/5 |
| 4,253,389 | 3/1981 | Campbell et al. | 100/5 |
| 4,517,890 | 5/1985 | Campbell et al. | 100/5 |
| 4,557,189 | 12/1985 | Schaible | 100/5 X |
| 4,619,193 | 10/1986 | Crew | 100/13 |
| 4,649,812 | 3/1987 | Mouret | 100/5 |
| 4,793,249 | 12/1988 | Wellman | 100/13 |
| 4,796,524 | 1/1989 | Renaud | 100/5 X |
| 4,800,811 | 1/1989 | Wellman | 100/5 |

Primary Examiner—Stephen F. Gerrity
Attorney, Agent, or Firm—Frank A. Seemar; Larry W. Miller

[57] ABSTRACT

Twine wrapping apparatus for a round baler having a bale forming chamber with a generally transverse crop infeed opening. The apparatus is mounted forward of the opening and includes a pair of individually extendable twine arms for dispensing twine into the chamber to wrap bales formed therein. A linkage arrangement provides for controlled swinging movement of the arms in concert through symmetrical paths that originate in the middle of the opening. The twine arms are in their outermost extended condition at the initiation of the twine dispensing phase and vary in length along their paths to a generally transverse rest position.

8 Claims, 6 Drawing Sheets

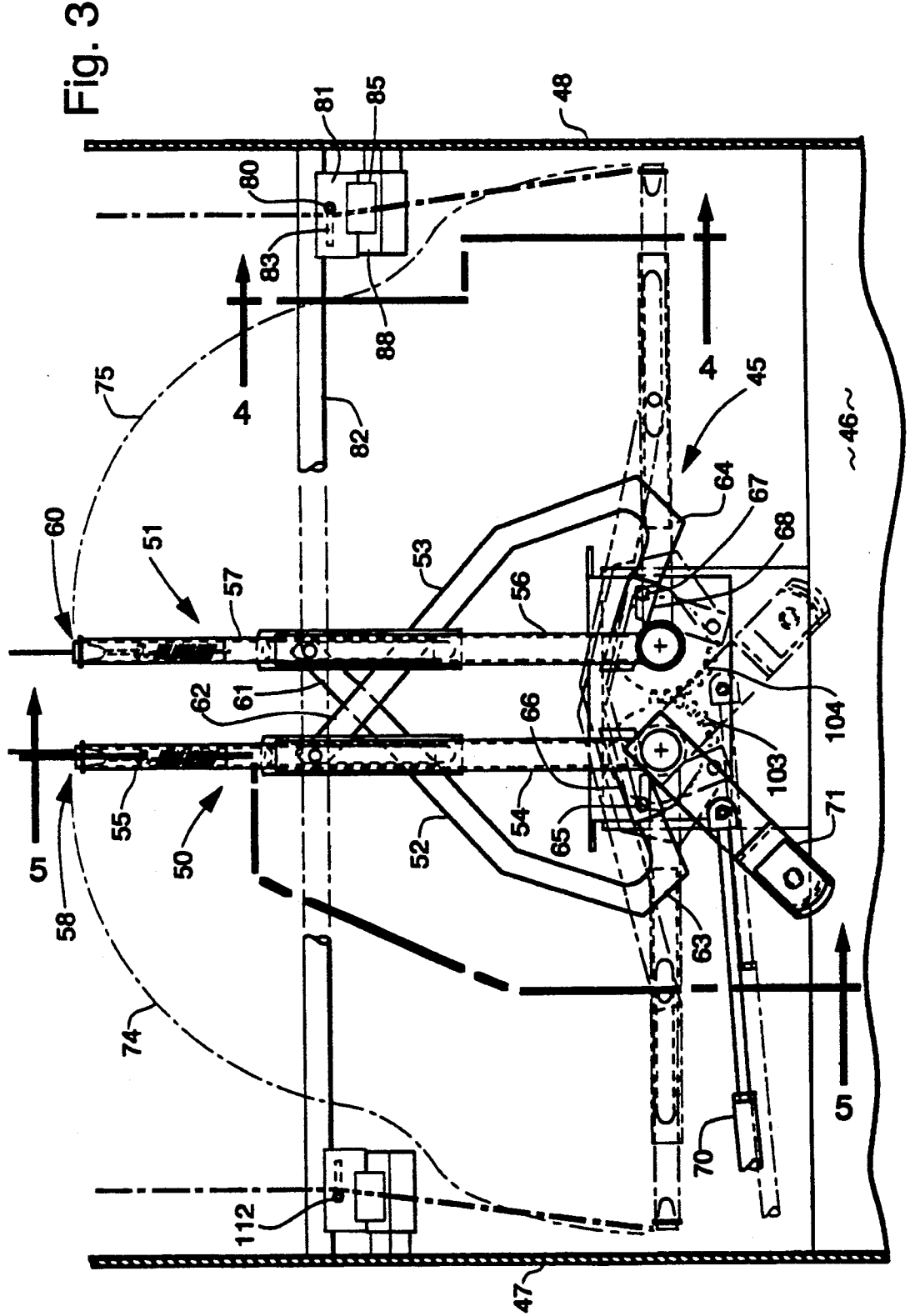

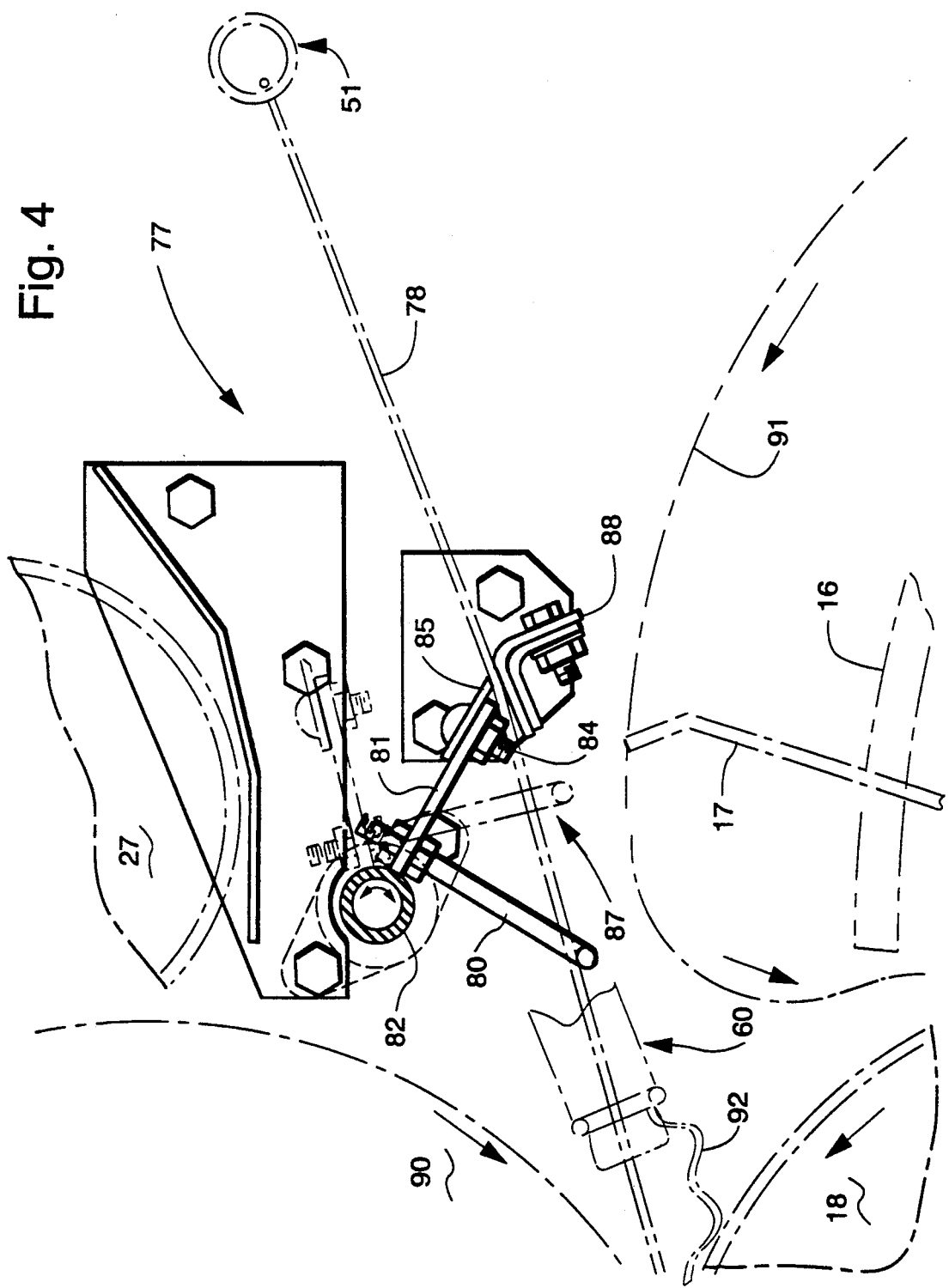

ROUND BALER TWINE WRAPPING APPARATUS

BACKGROUND OF THE INVENTION

This invention relates generally to a baler for forming cylindrical bales of crop material, commonly referred to as a round baler. More particularly, this invention is directed to twine wrapping apparatus for such round balers.

Balers of this type comprise a bale forming chamber defined by an array of belts, chains, and/or rolls in which the cylindrical bale is formed. Crop material such as hay is picked up from the ground as the baler traverses the field and is then fed into the chamber to be rolled up to form a cylindrical bale. Wrapping apparatus is provided for binding the bale inside the bale forming chamber before being discharged onto the ground for subsequent handling. It is common to utilize twine tubes to feed one or two strands of twine to the circumference of the formed bale during the process of helically wrapping the twine around the bale. The twine tubes are moved such that the strand feeding point varies along a transverse path adjacent the outer surface of the bale as the bale is turned in the chamber.

As noted above, to accomplish such wrapping the formed cylindrical bale is rotated in the bale forming chamber by the crop roll forming apparatus. During this operation additional crop material is not being introduced into the chamber, and accordingly, the baler is unable to function in its principle manner, i.e., it is not traveling across the field, picking up crop material and feeding it into the chamber to roll it into a cylindrical package. Prior art round balers have been designed to minimize this non-crop-feeding phase of the baling operation. For example, efforts have been made to reduce the wrapping time and thereby increase overall productivity by increasing the field travel time relative to the wrapping time. One approach involves the use of dual twine feeding devices such as those shown for exemplary purposes in U.S. Pat. No. 4,517,890, U.S. Pat. No. 4,557,189 and U.S. Pat. No. 4,800,811. These devices feed twine at approximately twice the rate of a single twine arm arrangement, resulting in a more favorable ratio of field working time versus twine wrapping time.

There have been various approaches to improve other aspects of the twine wrapping operation of round balers. For example, it is important that the initial free end of the strand, commonly referred to as the "tail", is positioned as close to the outer surface of the bale as possible to assure that the twine is immediately and properly fed to the circumference of the bale being wrapped. In many prior art arrangements directed to solving these problems, as in the case of the dual arm concept, the wrapping apparatus is typically mounted in the vicinity of the crop infeed area where significant amounts of dust and debris are common, especially during dry field conditions. There are detrimental effects caused by such dust and debris which increases the closer the apparatus is mounted to the baling chamber where the crop material is being agitated by the roll forming mechanism. A major problem with such closely positioned prior art arrangements is that debris tends to accumulate on the twine feeding elements and interferes with their smooth operation and thus affects the overall reliability of the baler. Also, this accumulation of debris can reach levels where it disrupts crop infeed during the following bale formation.

Another concern is that the abrasive characteristics of this dust and debris can and in fact does cause serious wear problems when it comes in contact with the wrapping apparatus which comprises various intermeshing and moving mechanisms arranged to effectively position and guide the twine across the baling chamber infeed area. These wear problems in turn have an unfavorable effect on the overall durability and reliability of the baler.

SUMMARY OF THE INVENTION

An important object of the present invention is to provide improved twine wrapping apparatus for a round baler which enhances the durability and reliability of the baler without sacrificing overall productivity.

In pursuance of this and other important objects the present invention provides for new and unique twine wrapping apparatus for a round baler having a bale forming chamber with a generally transverse crop infeed opening, a pair of sidewalls, a twine handling assembly mounted between the sidewalls and forwardly of the infeed opening, the twine handling assembly including a pair of twine arms each having a twine dispensing end from which twine is dispensed in the vicinity of the opening and fed therethrough for wrapping bales formed in the forming chamber, the twine handling assembly also including drive means for controllably moving the twine arms through predetermined swinging paths, and a pair of twine guide assemblies mounted on the side walls for guiding the twine during the time it is being dispensed in the vicinity of the side walls to wrap the ends of the bale. More specifically, the preferred embodiment of the invention contemplates apparatus of the type described above wherein each twine arm comprises first and second members, the second members being operative to reciprocate relative to the first members between extended and retracted positions, the twine dispensing ends each being disposed on the outer ends of the second members, the drive means for controllably moving including means for moving the twine arms through swinging paths, and means for coupling the twine arms for reciprocating the second members in concert between extended and retracted positions to guide the twine dispensing ends along separate predetermined curved paths for dispensing twine. The ends are initially adjacent the middle of the infeed opening when the second members are in the extended position and travel along symmetrical paths that pass in the vicinity of the twine guides to finally terminate in the vicinity of the sidewalls rearward of the guides.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 3 is a view taken in the same direction as FIG. 2 and shows a phantom outline of the twine arms in a different retracted position.

FIG. 4 is a view taken in the direction of arrows 4—4 in FIG. 3 and shows a phantom outline of a bale and various elements of the round baler.

DESCRIPTION OF THE PREFERRED EMBODIMENT

Figure 1:
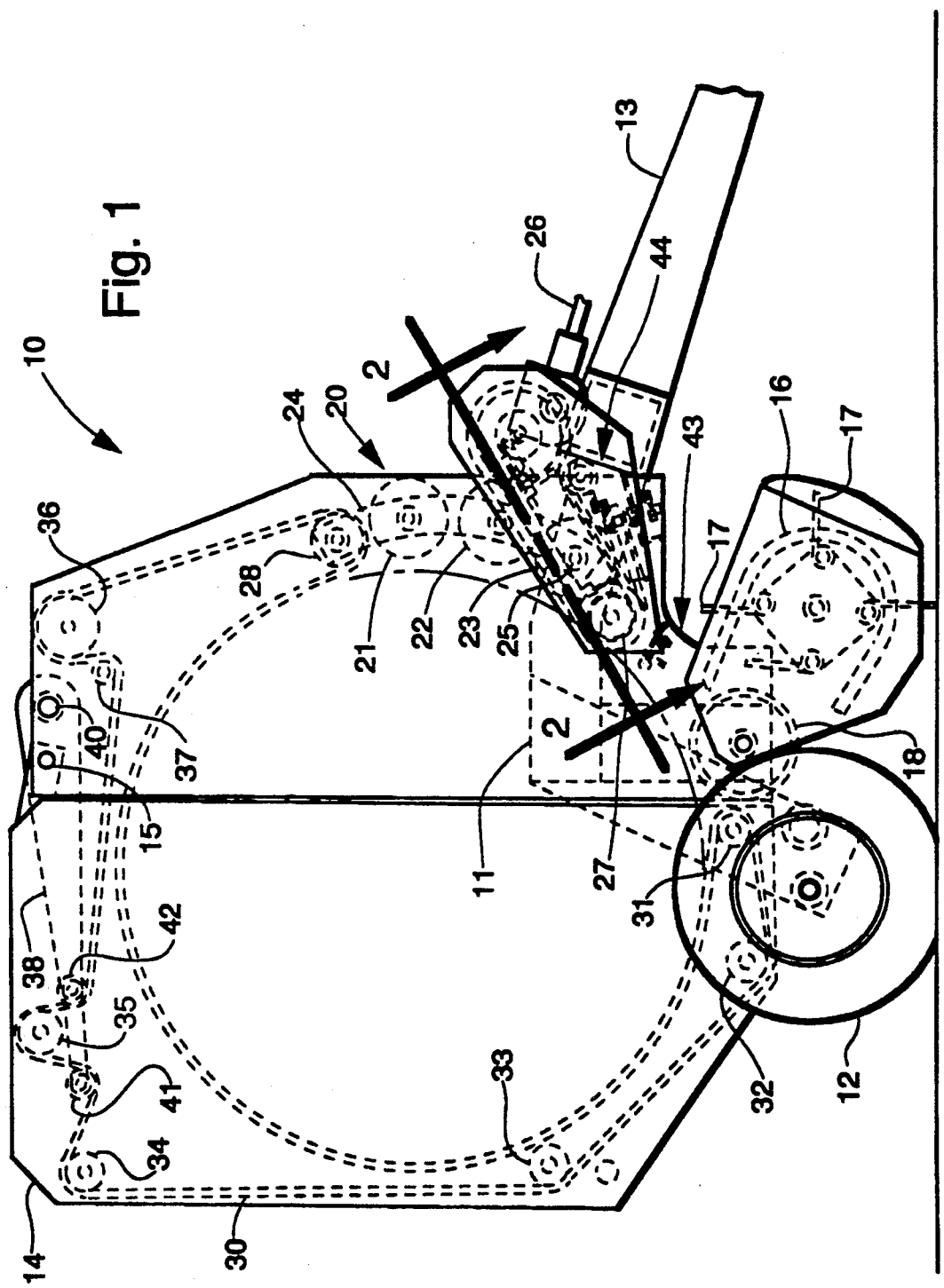
FIG. 1 is a side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,956,968 issued on Sep. 18, 1990. It includes a main frame 11 supported by a pair of wheels 12 (only one shown), a tongue 13 on the forward portion of main frame 11 for connection to a tractor and a tailgate 14 pivotally connected to main frame 11 by stub shafts 15 so that tailgate 14 may be closed as shown in FIG. 1 during bale formation and wrapping or opened to discharge a completed bale. A conventional pickup 16 is mounted o main frame 11 and is commonly supported by a pair of wheels (not shown).

Pickup 16 includes a plurality of fingers or tines 17 movable along a predetermined path to lift crop material from the ground and deliver it toward a floor roll 18 which is rotatably mounted on main frame 11.

The baler depicted in FIG. 1 shows a sledge assembly 20 having a plurality of rollers 21, 22, 23 extending transversely of main frame 11 in an arcuate array common to the type baler described in U.S. Pat. No. 4,956,968, mentioned above.

Rollers 21, 22, 23 are journalled at the ends thereof in a pair of spaced apart arms 24(only one shown) pivotally mounted inside main frame 11 on stub shafts 25 for permitting pivotal movement of the sledge between a bale starting position (shown in U.S. Pat. No. 4,956,968) and the full bale position shown in FIG. 1. Rollers 21, 22, 23 are driven in a counter clockwise direction (as viewed in FIG. 1) by conventional means, for example, chains and sprockets or gears, connected with a drive shaft 26 which is adapted for coupling to a PTO (power take off) of a tractor (not shown). A starter roll 27 is located adjacent roller 23 and is also driven in a counter-clockwise direction to strip crop material from roller 23. A freely rotatable idler roller 28 is also mounted on arms 24 for movement with sledge assembly 20.

A conventional apron, generally referred to by reference numeral 30, includes a plurality of continuous flat side by side belts supported by guide rolls 31, 32, 33, 34, 35, rotatably mounted in tailgate 14. Apron 30 is also supported on a drive roll 36 rotatably mounted on main frame 11. Although apron 30 passes between roller 21 and idler roller 28, it is in engagement with only idler roller 28 while roller 21 is located in close proximity to apron 30 to strip crop material from its belts (referred to above). Further conventional means (not shown) are connected with drive shaft 26 to provide rotation of drive roll 36 in a direction causing movement of apron 30 along the path indicated in broken lines in FIG. 1. An additional guide roll 37 in main frame 11 ensures proper driving engagement between apron 30 and drive roll 36. A pair of take up arms 38 (one shown) are pivotally mounted on main frame 11 by a cross shaft 40 for movement between varying inner and fixed outer positions, corresponding to bale forming and full bale conditions, respectively. The full bale position shown in FIG. 1 will suffice for the proposes of the description of this invention. Further, it should be noted that take up arms 38 carry additional guide rolls 41,42 for supporting apron 30. Resilient means (not shown) are provided to normally urge take up arms 38 toward their inner positions while resisting movement thereof from their inner positions to their outer positions to keep tension on the roll forming belts in a known manner.

As baler 10 is towed across a field by a tractor, pick up tines 17 lift crop material from the ground and deliver it into the bale forming chamber through the transverse infeed opening, commonly referred to as the throat 43, which in the baler shown is defined by floor roll 18 and starter roll 27. The crop material fed through throat 43 is continuously coiled in a clockwise direction until the inner courses of apron 30 expand to the position shown in FIG. 1. This bale formation takes place in a well known manner, after which wrapping takes place (described below), tailgate 14 is opened, the wrapped bale is discharged rearwardly in a conventional manner, tail gate 14 is closed and the round baler is again ready to form another bale.

Now turning to the wrapping apparatus of the present invention which in its preferred embodiment is adapted to the structure of the above described round baler. It should be noted that it is not intended that its use be limited to balers of this nature, but that it is contemplated that the present invention is adaptable for use on many if not all current round balers using twine wrapping as a securing means. The wrapping apparatus 44 shown in FIG. 1 is best described by referring first to FIG. 2 where the twine handling assembly, generally referred to by reference numeral 45, is shown mounted on a frame member 46 between sidewalls 47, 48. The assembly includes a pair of twine arms 50, 51 shown in their rearmost extended position and coupled together by first and second link members 52, 53. Each twine arm comprises first and second members 54, 55 and 56, 57, the second members each being telescopically mounted within each corresponding first member, and twine dispensing ends 58, 60 at the outer ends of the second members. The link members each have outer ends 61, 62 and inner ends 63, 64 whereby the outer end of each is pivotally coupled to the second member of one of the twine arms and the inner end is attached to the first member of the other twine arm. More specifically, first link member 52 comprises outer end 61 and inner end 63, the inner end of which is pivotally connected, via a pivot pin 65, to a rigid strap 66, which in turn is affixed to first member 54 of twine arm 50. Likewise, second link member 53 comprises outer end 62 and inner end 64, the inner end of which is pivotally connected, via pivot pin 67, to rigid strap 68, which in turn is affixed to first member 56 of twine arm 51.

Twine arm 50 is driven in a counter clockwise direction and twine arm 51 is driven in a clockwise direction when the drive arm 70 urges the driven link 71 to the position shown in phantom outline. Due to the unique coupling arrangement between the twine arms, which will be explained in further detail below, the twine arms rotate to the phantom position shown with the second member of each arm retracting within the first member of each arm. The normal path of the twine arms in the fully extended position (without the coupling in place) would be along the arcuate paths 72 and 73. Now turning to FIG. 3, the twine wrapping apparatus is shown in solid lines to be in the same position as in FIG. 2, but in the phantom outline the twine arms are shown in their fully rotated position. The predetermined curved paths 74 and 75 describe the actual path along which the outer ends of the twine arms travel and the importance of the shape of these paths will become apparent as the twine guide assemblies 76, 77 are described.

In FIG. 4 twine guide assembly 77 (shown generally in FIGS. 2 and 3) is shown in relationship to twine 78, shown in phantom to illustrate the path during engagement with guide pin 80. Pin mounting plate 81, affixed to rotatable shaft 82, provides a slot 83 (see FIGS. 2 & 3) along which pin 80 is adjusted and has a knife 85 attached thereto by bolt 84. During wrapping, pin 80 is disposed in the phantom position 87 for guiding twine as shown in FIG. 3. When the twine arms reach the fully rotated positions shaft 82 rotates plate 83 to the position shown in full lines whereby knife 85 engages the twine against striker plate 88 to provide severing of the twine leaving a tail portion having a length corresponding to the distance between twine tube 51 (shown in phantom) and knife 85.

FIG. 4 also shows various components of the baler in phantom for illustrative purpose to assist in the description of the operation of the invention. A fully formed round bale, generally designated by reference numeral 90, is shown in relationship to floor roll 18, pickup tine 17, the path 91 of tines 17, starter roll 27 and twine dispensing end 60 in its fully extended center position with a twine tail 92 extending loosely therefrom.

Figure 6:
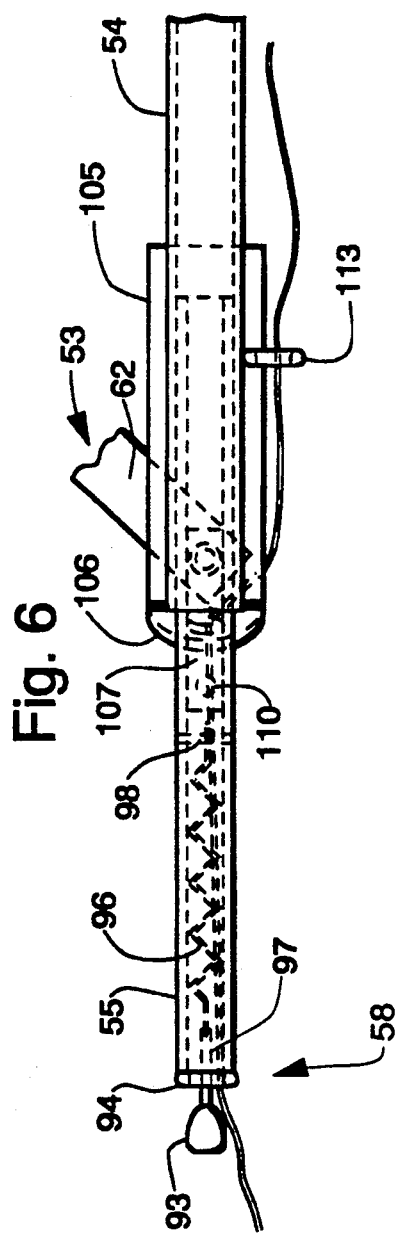
FIG. 6 is a view taken in the direction of arrows 6—6 in FIG. 5.
Figure 5:
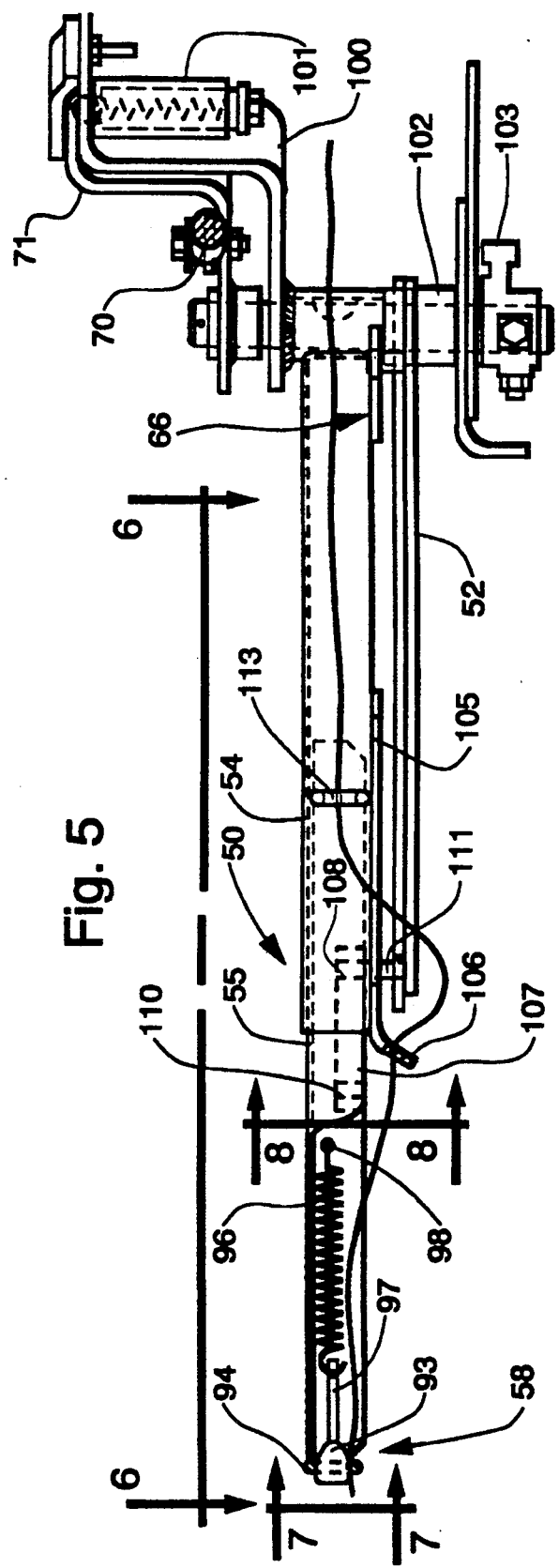
FIG. 5 is a view taken in the direction of arrows 5—5 in FIG. 3.

Twine arm 50, shown in fully extended position in FIG. 5, includes a clamping spool 93 secured in a nesting fashion within end ring 94 attached to the end of twine arm member 55. Spool 93 is urged into engagement with ring 94 by a spring 96 stretched between tab 97 affixed to spool 93 and spring anchor 98 attached to twine arm member 55. Spool 93 and spring 96 combine to provide a clamping function by holding the twine between spool 93 and ring 94 at the point from which it emerges from the twine dispensing end 98. FIG. 6 shows clamping spool 93 in the extended position which is accomplished by manually urging the spool 93 against the spring force provided by spring 96. This extension of spool 93 permits initial threading of twine through ring 94.

Figure 2:
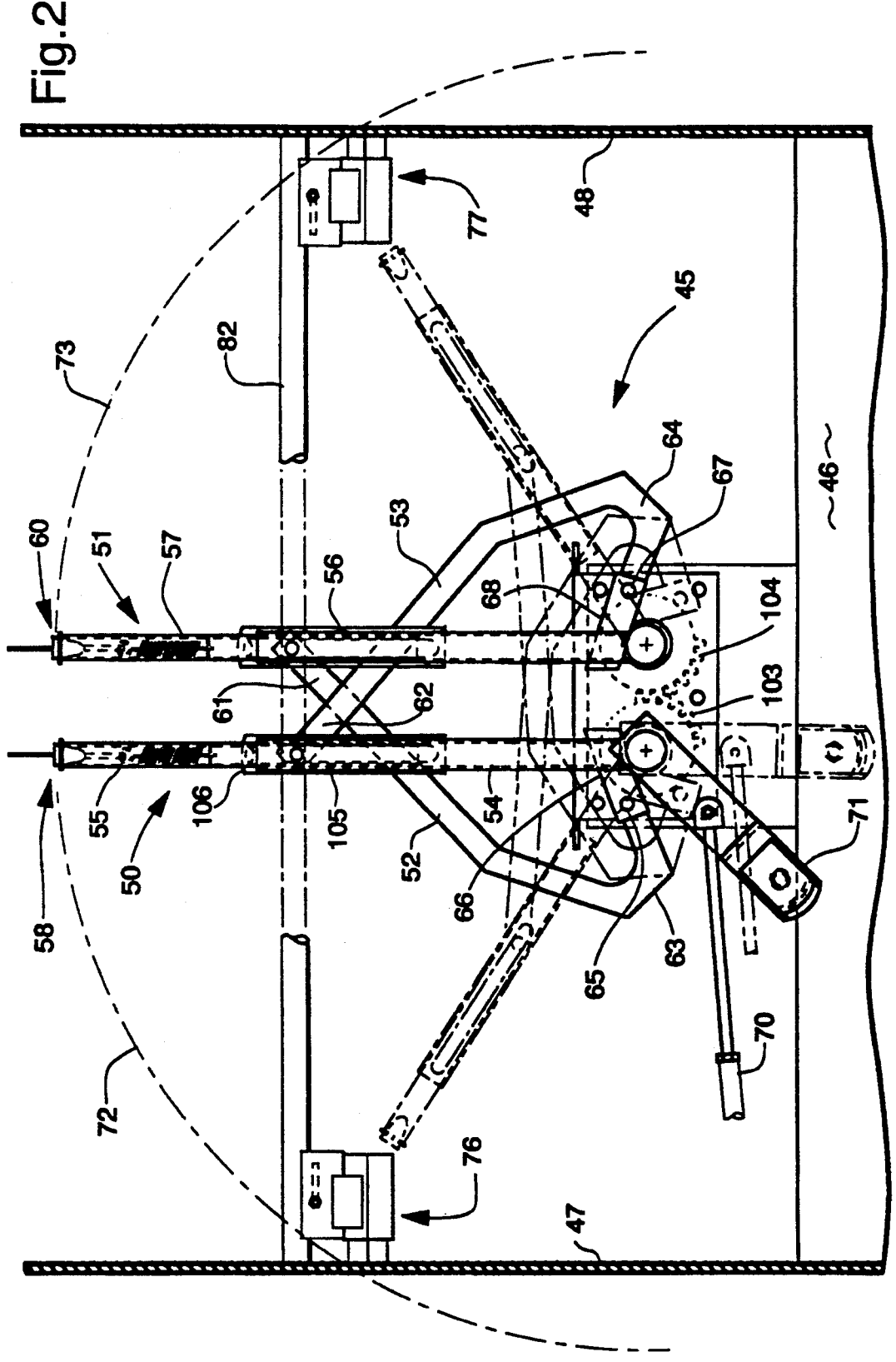
FIG. 2 is a view taken in the direction of arrows 2—2 in FIG. 1 and shows a phantom outline of the twine arms in a retracted position.

The drive arrangement for twine arm 50 includes a drive lever 100 that is driven with driven link 71 by drive arm 70 via an intermediate break away arrangement 101 that operates in a well known manner. Drive lever 100 is secured to a sleeve 102 as is first twine arm member 54. Thus, when drive arm 70 rotates driven link 71 and drive lever 100 twine arm 50 attached to sleeve 102 is rotated therewith. The other twine arm 51 is also rotated in concert with twine arm 50 via drive gear 103 which meshes with driven gear 104 (FIG. 2). As twine arms 50 and 51 are rotated in this manner the outer portions thereof (members 55 and 57) are telescopically retracted through a unique interrelated coupling system that is now to be described.

Figure 7:
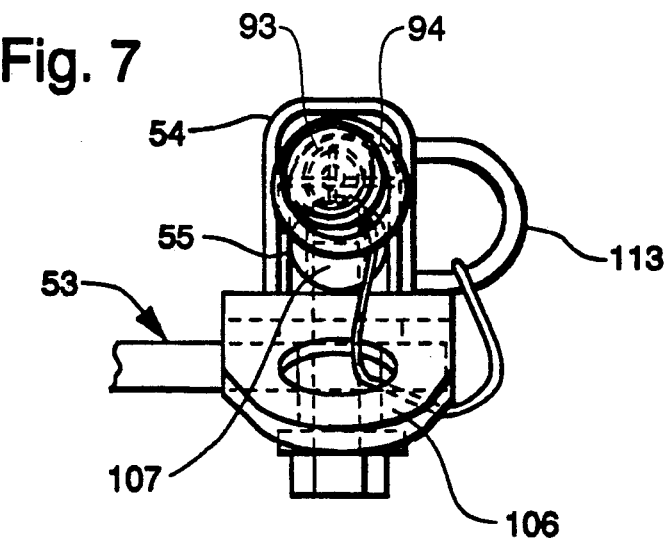
FIG. 7 is a view taken in the direction of arrows 7—7 in FIG. 5.
Figure 8:
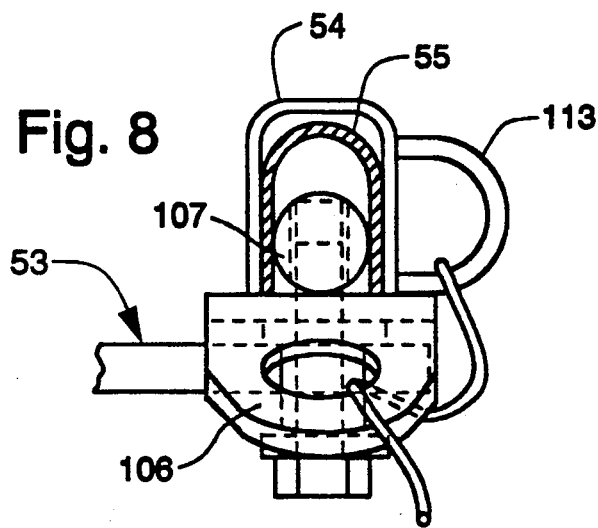
FIG. 8 is a view taken in the direction of arrows 8—8 in FIG. 5.

First member 54 of twine arm 50, secured to sleeve 102, is generally U-shaped in cross section (FIGS. 7 and 8) and includes a base member 105 secured to the outer bottom portion thereof, which base has a downwardly inclined flange 106 with a twine guide aperture. The second twine arm member 55 is also U-shaped in cross section and fits for sliding engagement within first arm member 54 (see FIG. 8). Secured to second arm member 55 is pivot mounting block 107 (circular in cross section) having two bores 108, 110 for receiving link pivot pin 111 in bore 108 (as shown) or bore 110 to shorten the twine arm. Also secured to first member 54 and moveable therewith is rigid strap 66 (a similar strap 68 is secured to member 56) to which the inner first end 63 of first link member 52 is attached via pivot pin 65. Again, a similar pivot pin 67 links strap 68 to second link member 53.

When twine arms 50 and 51 are rotated by drive arm 70 in counter clockwise and clockwise directions, respectively, the coupling between them, comprising first and second link members 52 and 53, changes the overall length of the arms by retracting in concert the second members telescopically within the first members. During this rotation the twine dispensing ends of the twine arms travel along predetermined curved paths 74 and 75 the configuration of which is determined by the shape and relationship of links 52 and 53. More particularly, it should be noted that the paths avoid twine guide assemblies 76, 77. The twine arms begin in a fully extended position, fully retract to avoid guide assemblies 76, 77 and then partially extend again to position the twine dispensing ends of twine arms 50, 51 adjacent side walls 47, 48.

In operation, the twine wrapping apparatus of the present invention is nonoperative during bale formation. After a bale has been formed in the bale forming chamber the twine arms leave their rest position which is shown in phantom in FIG. 3. At that point the twine has been severed and a tail extends loosely from the twine dispensing tips clamped in place by clamping spools. The twine arms then swing to the fully extended position shown in FIGS. 2 & 3 and place the tails on floor roll 18 which is rotating in a counterclockwise direction (FIG. 4). Floor roll 18 normally has an aggressive surface and that in conjunction with its rotation assure that the twine tail 92 will be fed to the nip between bale 90 and the floor roll 18. The full extension of the twine arms permits dispensing tips 58, 60 to start dispensing twine from the position shown in phantom in FIG. 4. At that point the twine is pulled from the twine tubes in a known manner and the rotation of the tubes guide the twine along a lateral path as it proceeds to feed out twine that is being spirally wrapped around the bale being rotated in the bale chamber.

As the twine tips continue along curved paths 74, 75 the twines extend rearwardly in a direction generally parallel to side walls 47, 48 and eventually come in contact with guide pins 80 and 112 to prevent the twine wraps from being applied on the outermost portion of the cylindrical surface of the bale, which again is a well known expedient in the round baler art. What is unique about the present invention is the ability to avoid contact between the twine dispensing ends and the guide assemblies while still permitting the tips to extend immediately behind the guide assemblies during rotation. This intermediate twine arm position is best illustrated by the phantom outlines shown in FIG. 2 where the arms are in the fully retracted position adjacent to the guides just prior to the time when they will tuck in behind the guides permitting almost immediate contact between the twines and the guide pins.

Included in the many advantages, explicit and implicit, of the novel apparatus of the present invention is the ability of providing a round baler with a twine wrapper that is mounted in an area that is convenient functionally but is not detrimental from an operational standpoint. The telescoping twine arms permit mounting as far away from the baling chamber as possible while still operating within the confines of the baler sidewalls. The unique interrelationship of the twine arms guides them around the twine guide assemblies without obviating the purpose of the guides. The dual arm arrangement inherent in the invention also enhances the speed with which the baler can operate by reducing the twine wrapping time versus a single arm arrangement. Equally as important is the advantage of the novel arrangement to provide reliable twine wrap starting by presenting the twine tail in the close proximity of the nip between the bale and the floor roll when a bale is ready for wrapping regardless of the setting of the guide pins.

Thus a reliable more durable round baler twine wrapper is provided without affecting the operational and functional aspects of the machine.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. Improved twine wrapping apparatus for a round baler comprising a bale forming chamber, a generally transverse crop infeed opening in said chamber, a pair of sidewalls, a twine handling assembly mounted between said sidewalls and forwardly of said opening, said twine handling assembly including a pair of twine arms each having a twine dispensing end from which twine is dispensed in the vicinity of the opening and fed therethrough for wrapping bales formed in the forming chamber, said twine handling assembly further including means for controllably moving said twine arms to dispense twine across said opening from said twine dispensing ends, and a pair of twine guide assemblies mounted on said side walls for guiding the twine during a portion of the time it is being dispensed, the improvement wherein each said twine arm comprises first and second members, said second members operative to reciprocate relative to said first members between extended and retracted positions, said twine dispensing ends each disposed on said second members at the outward ends thereof, said means for controllably moving includes drive means for moving said twine arms, and means for coupling said twine arms for reciprocating in concert said second members between extended and retracted positions to guide said twine dispensing ends along separate predetermined curved paths that are initially adjacent the middle of said opening when said second members are in said extended position.

2. In twine wrapping apparatus as set forth in claim 1 wherein said means for coupling further comprise first and second link means, said first link means having a first end affixed to one of said twine arms and a second end pivotally affixed to said second member of the other twine arm, and said second link means having a first end affixed to said other twine arm and a second end pivotally affixed to said second member of said one of said twine arms.

3. In twine wrapping apparatus as set forth in claim 2 wherein said drive means moves said twine arms through opposing swinging motion and said curved paths are symmetrical and terminate adjacent said side walls under conditions where said swinging motion takes place.

4. In twine wrapping apparatus as set forth in claim 2 wherein said first and second link means each comprises first and second elements and intermediate pivot means coupling said first and second elements together.

5. In twine wrapping apparatus as set forth in claim 4 wherein said drive means moves said twine arms through opposing swinging motion and said curved paths are symmetrical and terminate adjacent said side walls under conditions where said swinging motion takes place.

6. In twine wrapping apparatus as set forth in claim 1 wherein said twine guide assemblies are mounted adjacent said predetermined curved paths and the twine is guided from said twine dispensing ends to said opening during the latter portion of the travel of said twine dispensing ends along said paths.

7. In twine wrapping apparatus as set forth in claim 6 wherein said means for coupling comprise first and second link means operably coupling said twine arms to provide curve paths that avoid engagement between said twine dispensing ends and said twine guide assemblies.

8. In twine wrapping apparatus as set forth in claim 7 wherein said drive means moves said twine arms through opposing swinging motion and said curved paths are symmetrical and terminate adjacent said side walls under conditions where said swinging motion takes place.

* * * * *